(12) United States Patent
Miyazaki et al.

(10) Patent No.: US 11,481,458 B2
(45) Date of Patent: Oct. 25, 2022

(54) INFORMATION PROCESSING SYSTEM AND NON-TRANSITORY COMPUTER READABLE MEDIUM STORING PROGRAM

(71) Applicant: FUJIFILM Business Innovation Corp., Tokyo (JP)

(72) Inventors: Kana Miyazaki, Kanagawa (JP); Kimiko Sakurai, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 281 days.

(21) Appl. No.: 16/776,487

(22) Filed: Jan. 29, 2020

(65) Prior Publication Data
US 2021/0026907 A1    Jan. 28, 2021

(30) Foreign Application Priority Data
Jul. 24, 2019 (JP) .............................. JP2019-135861

(51) Int. Cl.
| | |
|---|---|
| *G06F 16/9536* | (2019.01) |
| *G06F 16/9535* | (2019.01) |
| *H04L 51/046* | (2022.01) |
| *H04L 12/18* | (2006.01) |
| *H04L 51/212* | (2022.01) |

(52) U.S. Cl.
CPC ...... *G06F 16/9535* (2019.01); *G06F 16/9536* (2019.01); *H04L 12/1818* (2013.01); *H04L 51/046* (2013.01); *H04L 51/212* (2022.05)

(58) Field of Classification Search
USPC .............................................. 705/5; 709/200
See application file for complete search history.

(56) References Cited

U.S. PATENT DOCUMENTS

| | | | | |
|---|---|---|---|---|
| 8,996,639 | B1 * | 3/2015 | Faaborg | H04L 51/02 455/412.2 |
| 9,491,237 | B1 * | 11/2016 | Garg | H04L 12/1845 |
| 10,652,394 | B2 * | 5/2020 | Van Os | H04M 3/533 |
| 2004/0006697 | A1 * | 1/2004 | Noyama | H04L 9/32 713/182 |
| 2014/0280527 | A1 * | 9/2014 | Chatterjee | G01C 21/3438 709/204 |
| 2015/0054616 | A1 * | 2/2015 | Friedman | G07C 9/27 340/5.53 |
| 2015/0112857 | A1 * | 4/2015 | Gellis | G06Q 50/01 705/39 |
| 2015/0193819 | A1 * | 7/2015 | Chang | G06Q 30/0252 705/7.19 |
| 2015/0248651 | A1 * | 9/2015 | Akutagawa | G06F 16/2465 705/7.19 |
| 2016/0112391 | A1 * | 4/2016 | Jamrog | G06F 16/24578 707/723 |

(Continued)

FOREIGN PATENT DOCUMENTS

| | | |
|---|---|---|
| JP | 2000167233 | 6/2000 |
| JP | 2017059160 | 3/2017 |

*Primary Examiner* — Anthony Mejia
(74) *Attorney, Agent, or Firm* — JCIPRNET

(57) ABSTRACT

An information processing system includes an acquirer that acquires, from a user, information related to invitation of persons who share a specific purpose, a receiver that receives a response for acceptance of the invitation, and an outputter that outputs information on a candidate place to be used by the user and an accepter who accepts the invitation.

16 Claims, 12 Drawing Sheets

(56) References Cited

U.S. PATENT DOCUMENTS

| | | | |
|---|---|---|---|
| 2017/0116579 A1* | 4/2017 | Emejulu | G06Q 10/1095 |
| 2017/0357917 A1* | 12/2017 | Holmes | G06Q 10/1093 |
| 2020/0210902 A1* | 7/2020 | VonAllmen | G06Q 10/02 |
| 2020/0294161 A1* | 9/2020 | Kuang | G06Q 10/02 |

* cited by examiner

FIG. 11A

| INVITER'S INFORMATION | REQUIREMENTS OF INVITATION |
|---|---|
| · SEX : FEMALE<br>· AGE : 20-29<br>⋮ ⋮ | · NATIONALITY : MEXICO<br>· NATIVE LANGUAGE: SPANISH<br>· SEX : FEMALE<br>· LEVEL OF LESSON : BUSINESS<br>⋮ ⋮ |

ACCEPT INVITATION — 11

FIG. 11B    2B

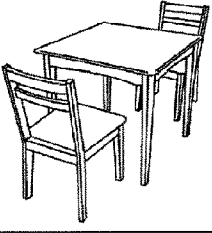

· MEETING PLACE    FEATURES
　　　　　　　　　　OPEN SPACE (FOR FIRST-TIME MEETING)

LOCATION
　　　　　　　　　　　NEW YORK...

NEAREST STATION
　　　　　　　　　　　GRAND CENTRAL TERMINAL

· DATE OF MEETING
6/2/2019 15:00-16:00

ARE YOU SURE TO MEET AT PLACE AND DATE ABOVE?

OK — 12    CANCEL — 13

INFORMATION PROCESSING SYSTEM AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-135861 filed Jul. 24, 2019.

BACKGROUND

(i) Technical Field

The present disclosure relates to an information processing system and a non-transitory computer readable medium storing a program.

(ii) Related Art

For example, Japanese Unexamined Patent Application Publication No. 2000-167233 discloses a system that achieves meeting of persons. The system includes a first mobile communication terminal carried by a first user, and a second mobile communication terminal carried by a second user. The first mobile communication terminal includes a recorder and a transmitter. The recorder records key data on the first user or key data on persons whom the first user wants to meet or get in touch with. The transmitter transmits the key data into an area. The second mobile communication terminal includes a recorder, a receiver, and a notifier. The recorder records key data on the second user or key data on persons whom the second user wants to meet or get in touch with. The receiver receives the key data transmitted from the first communication terminal by wireless. The notifier notifies the second user if the transmitted key data matches the key data on the second user.

SUMMARY

Aspects of non-limiting embodiments of the present disclosure relate to the following circumstances. A user may invite persons who share a specific purpose. In this case, it is necessary to determine a place where the user may directly meet an accepter who accepts the invitation.

If a user invites persons who share a specific purpose, it is desirable to provide information on candidate places to be used by the user and an accepter.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising an acquirer that acquires, from a user, information related to invitation of persons who share a specific purpose, a receiver that receives a response for acceptance of the invitation, and an outputter that outputs information on a candidate place to be used by the user and an accepter who accepts the invitation.

BRIEF DESCRIPTION OF THE DRAWINGS

An exemplary embodiment of the present disclosure will be described in detail based on the following figures, wherein:

FIGS. 11A and 11B illustrate a specific example of the processes to be executed by the matchmaking management server and the space management server.

DETAILED DESCRIPTION

An exemplary embodiment of the present disclosure is described below with reference to the drawings.

<Overall Configuration of Information Processing System>

Figure 1:
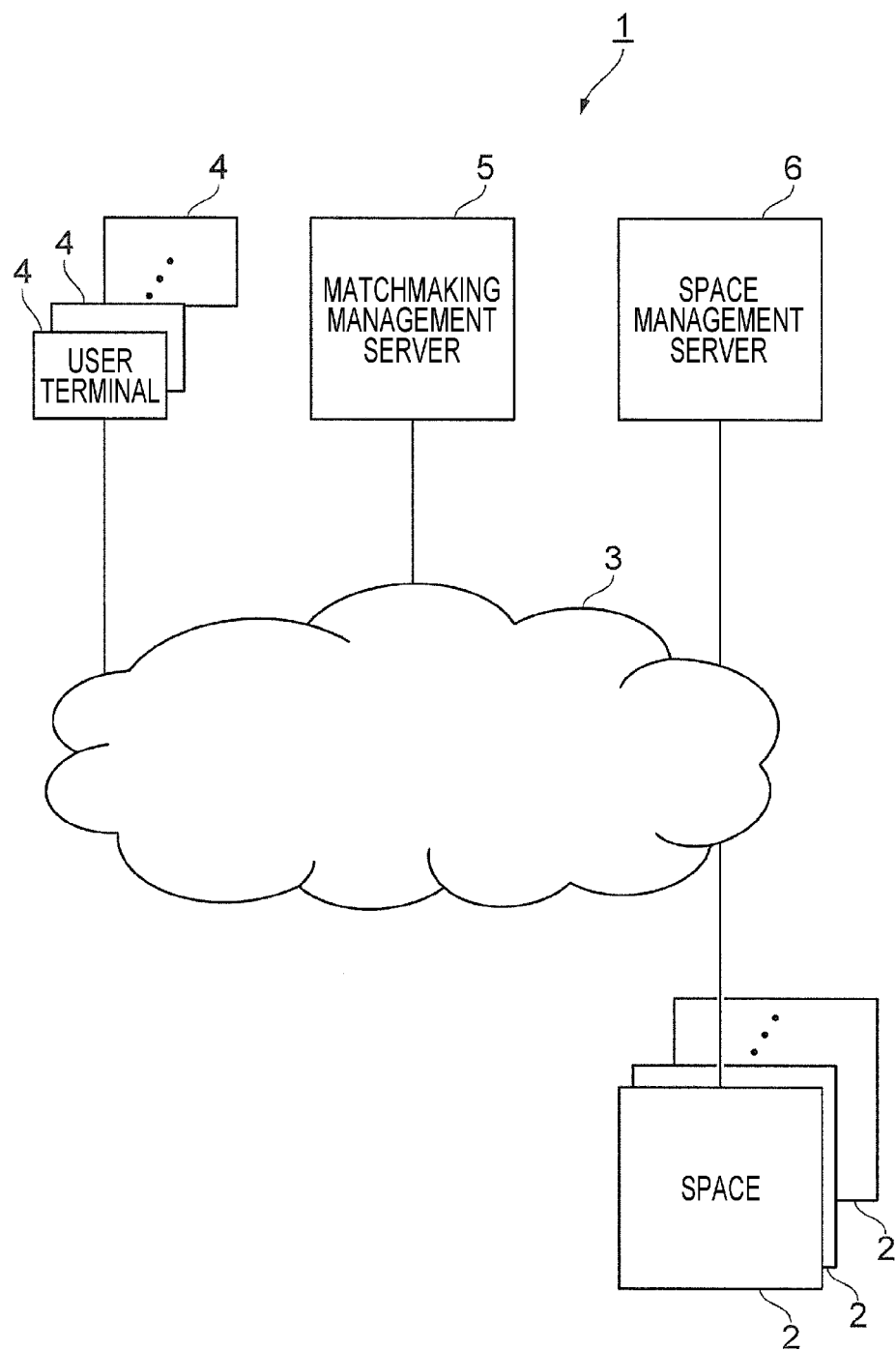
FIG. 1 schematically illustrates an example of the overall configuration of an information processing system according to an exemplary embodiment.

FIG. 1 schematically illustrates an example of the overall configuration of an information processing system 1 according to this exemplary embodiment. The information processing system 1 according to this exemplary embodiment includes various apparatuses and spaces 2 connected to a cloud network 3.

The spaces 2 include a booth, a room of an accommodation or the like, and a conference room of a company or the like. The spaces 2 may be movable places such as an automobile. Those spaces are examples of a space demarcated from surroundings with walls, partitions, or the like. The spaces 2 include a table and a seat in a restaurant or the like where a service is provided. Those spaces are examples of a space open to surroundings. Thus, the space 2 of this exemplary embodiment only needs to be a place available to a user and the type of the place is not limited.

The space 2 of this exemplary embodiment is assigned a name, a number, or the like for management. Reservations of the space 2 may be chargeable or free of charge.

If an electronic lock is attached to a door of the space 2, the space 2 is available under a condition that the user has an electronic key provided in advance. If the space 2 has no door, the space 2 is available, for example, by a method in which the user is authenticated by using an authentication code provided in advance or a manager of the space 2 verifies the name of the user who uses the space 2.

In this exemplary embodiment, a plurality of spaces 2 are provided as examples of a candidate place to be used by a user and an accepter and a place to be used by making a reservation.

As examples of the apparatuses connected to the cloud network 3, FIG. 1 illustrates user terminals 4 operated by users, a matchmaking management server 5 that manages matchmaking between users, and a space management server 6 that manages the spaces 2.

Matchmaking is a process of connecting users. Specifically, users are matched when one user invites persons who may share the users' specific purpose and another user accepts the invitation. The specific purpose is a purpose of invitation. For example, invitations are made for the purpose of business, foreign language acquisition, or marriage. In the case of business, companies are connected. In the case of foreign language acquisition, a teacher and a student are connected. In the case of marriage, candidates of marriage partners are connected.

A user inviting persons who may share a specific purpose may hereinafter be referred to as "inviter" and a user accepting invitation made by the inviter may hereinafter be referred to as "accepter".

In the case of FIG. 1, one server is prepared for each purpose or function. That is, one matchmaking management server 5 and one space management server 6 are prepared.

A plurality of servers may be prepared for one purpose or function or one server may be shared for a plurality of purposes or functions. For example, the matchmaking management server 5 may partially or entirely implement the functions of the space management server 6, or the space management server 6 may partially or entirely implement the functions of the matchmaking management server 5.

The number of business entities that manage a certain space 2 may be one or plural. For example, different business entities may individually have responsibilities for management of reservations, management of authority to use the space 2, management of entry/exit and usage of rooms, management of charges for use on users, and management of members registered as users. Different business entities may manage the respective spaces 2.

As described above, the spaces 2 to be managed for reservations need not be the same type of space. For example, a subset of the spaces 2 may be booths and another subset of the spaces 2 may be a seat and a table in a restaurant or the like.

A plurality of business entities may offer management of one purpose or function in cooperation.

The user terminal 4 is an apparatus to be used by a user. In this exemplary embodiment, the user terminal 4 is assumed to be a smartphone to be carried by a user. The user terminal 4 may be a so-called wearable terminal, a notebook computer, or a game console.

The matchmaking management server 5 manages matchmaking between users. For example, the matchmaking management server 5 acquires information related to invitations from inviters and receives responses for acceptance of invitations. The matchmaking management server 5 arranges meeting of inviters and accepters. The meeting means that an inviter and an accepter directly meet each other.

The space management server 6 manages various types of information related to spaces 2.

For example, the space management server 6 acquires meeting information from the matchmaking management server 5 and outputs information on a candidate space 2 to be used by an inviter and an accepter for meeting. The space management server 6 makes a reservation for a space 2.

The space management server 6 may manage reservations for goods and services associated with a space 2. For example, the space management server 6 may manage items for rent, and goods and services sold and/or consumed at the space 2.

<Structure of Space>

Figure 2:
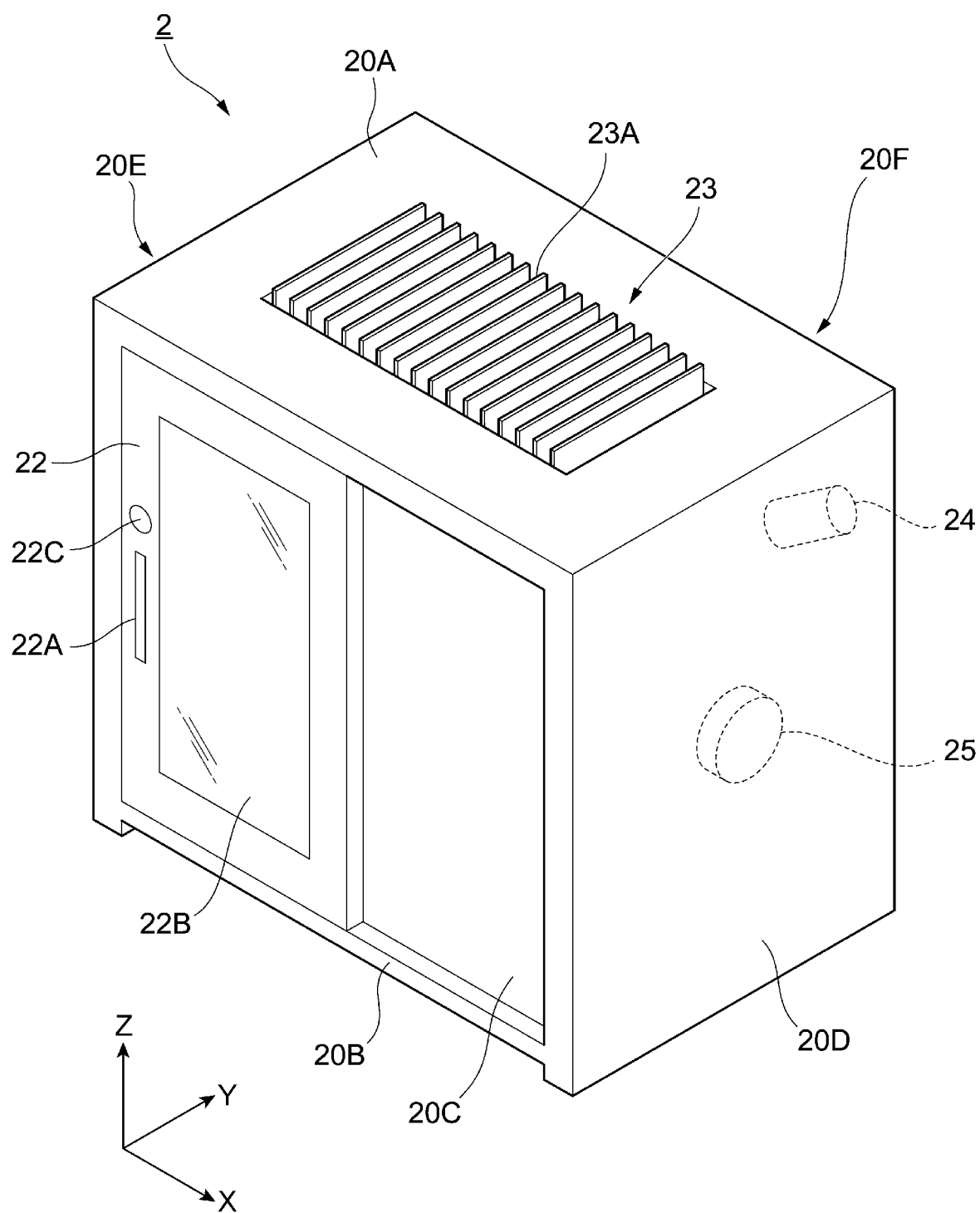
FIG. 2 illustrates an example of the external structure of a booth type space.

FIG. 2 illustrates an example of the external structure of a booth type space 2.

The booth type space 2 illustrated in FIG. 2 is arranged irrespective of indoors or outdoors. For example, the booth type space 2 is arranged in a station yard, an airport, an office building, a commercial facility such as a restaurant or a department store, a bank, a library, an art gallery, a museum, a public institution or facility, an accessway, or a park.

The booth type space 2 illustrated in FIG. 2 is a closed booth having a ceiling. The term "closed" does not mean "sealed" and the closed booth only needs to have a practical sound-proof property. Therefore, an opening or clearance such as an air vent or a small window may be provided in a portion of a frame that defines the space 2. The window may be openable and closable.

The frame of the space 2 illustrated in FIG. 2 includes a ceiling 20A, a floor 20B, a wall 20C having an openable and closable door 22, two walls 20D and 20E located on both sides of the wall 20C, and a wall 20F located opposite the door 22.

The ceiling 20A has a ventilating hole 23. A louver 23A capable of adjusting the opening area is attached to the ventilating hole 23. The louver 23A of FIG. 2 is fully open.

In this exemplary embodiment, the door 22 is assumed to be a sliding door movable along the wall 20C. In the case of FIG. 2, the door 22 is a single sliding door that slides in one direction. The door 22 may be a double sliding door to be opened or closed by moving two or more members in different directions, or a drawn door having two members slidable to right and left.

The door 22 is not limited to the sliding door. For example, the door 22 may be a single hinged door having one swingable member, or a double hinged door having one opening closed by two door members.

The door 22 may be a folding door to be opened by folding a pair of door members coupled by hinges. The folding door may be a folding door of a type in which door members are opened in one direction, or in which door members are opened in two directions.

As a special type of door, the door 22 may be a partition door or a retractable sliding door to be retracted into a wall when the door 22 is opened.

The door 22 may be opened inward or outward. The door 22 has a handle 22A to be gripped by a user when the door 22 is opened or closed.

A member 22B subjected to treatment in consideration of confidentiality and security is arranged at the center of the door 22. Examples of the member 22B include a transparent plate in which a metal plate having many arrays of holes (for example, a perforated metal) is attached on an inner side, a transparent plate in which a screen member is attached on an inner side with a clearance, a transparent plate having a film that makes it easy to view the inside from the front but difficult to view the inside in a slanting direction, and a transparent plate subjected to treatment for reducing internal visibility.

For example, glass or an acrylic resin is used for the transparent plate. A characteristic related to the transparency of the film bonded for confidentiality and security is determined based on a relationship between the position of the door 22 and the working position of the user. If the user works on a far side behind the front of the door 22, it is appropriate to use a film that makes it difficult to view the inside from the front but easy to view the inside in a slanting direction.

The film may be a liquid crystal film whose transparent state and opaque state are switchable electrically, or a polarizing film whose transmittance is controllable electrically.

Examples of the treatment for reducing visibility include finely scoring the surface of the member so that light is scattered.

The treatment may be performed on a portion of the member 22B. For example, the structure may be provided such that the member 22B is transparent near the floor and the ceiling and the visibility is reduced through the treatment in a range in which a monitor may be viewed during work.

By arranging the member 22B, the presence or absence of the user may be checked from the outside while hiding a screen of the monitor from the outside.

An electronic lock 22C unlockable with an electronic key is attached to the door 22.

The treatment in consideration of confidentiality and security may be performed on a member other than the door 22. For example, the treatment may be performed on at least a portion of the wall 20D, 20E, or 20F.

The number of users of the space 2 is roughly determined depending on the volume of the space 2. The space 2 illustrated in FIG. 2 is assumed to be a private room that is basically used by a few users (e.g., one to three users). The space 2 according to this exemplary embodiment may be a large room capable of accommodating many users. The large room may be formed as a single room but may be formed by removing one or both of the walls 20D and 20E of the space 2 and coupling a plurality of spaces 2.

The shape and structure of the frame that defines the space 2 and the provided equipment and performance thereof are arbitrary. For example, the ceiling 20A may be omitted.

In this exemplary embodiment, a desk and a chair (not illustrated) are arranged in the frame. Furnished equipment and devices or reserved equipment and devices are arranged on the desk.

An image capturing apparatus 24 such as a camera that captures an image of the inside of the frame and a motion sensor 25 that detects a user in the frame are provided in the frame. An information acquisition apparatus (not illustrated) that acquires information on each user of the space 2 may be provided on an outer side of the frame. Examples of the information acquisition apparatus include a reader that reads an ID card held by a user, and a reader that reads a fingerprint or a vein pattern of a user.

As described above, the type of the space 2 of this exemplary embodiment is not limited. The space 2 may be a closed space or an open space that is open to the outside. Each space 2 is associated with attribute information indicating an attribute such as "closed type" or "open type".

Irrespective of whether the spaces 2 are open or closed, the spaces 2 vary in terms of equipment, size, or surrounding environment. Each space 2 is associated with various types of information related to the function and performance of the space 2, such as "closed or open", equipment, size, and surrounding environment.

<Hardware Configurations of Apparatuses>

Figure 3:
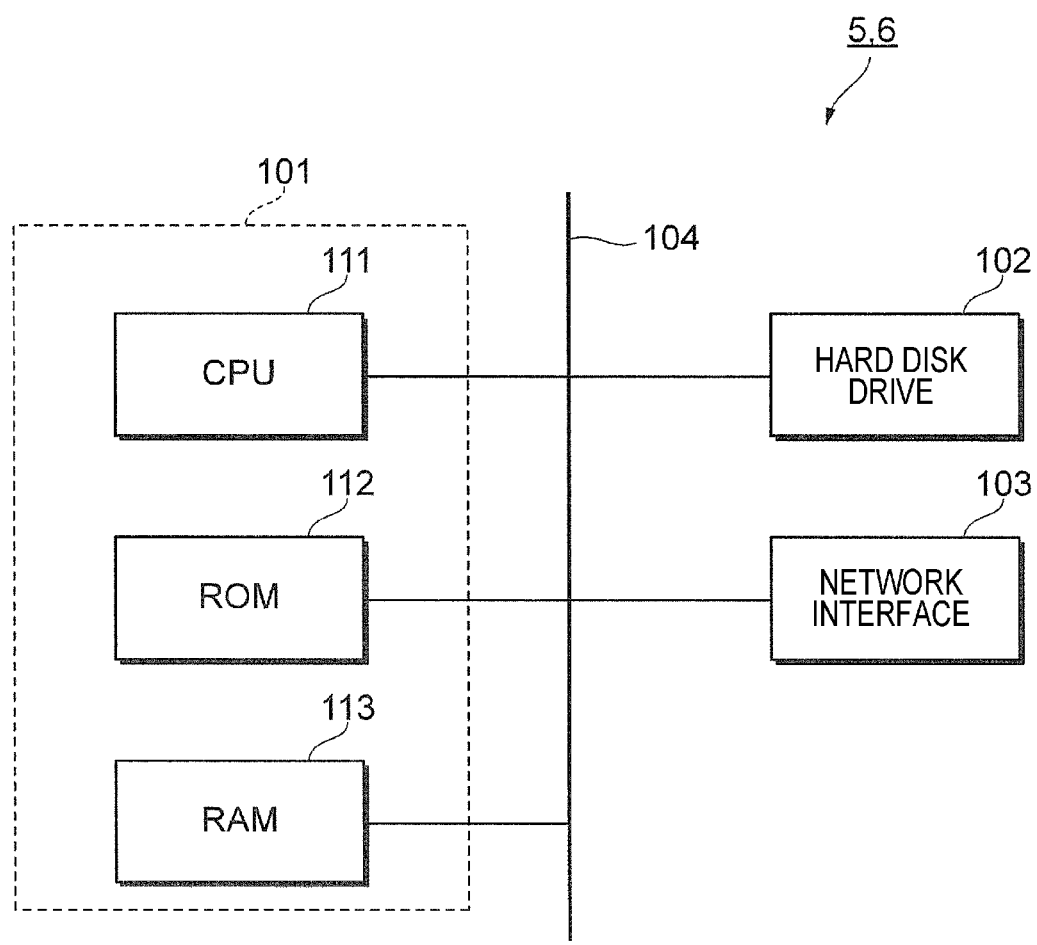
FIG. 3 illustrates an example of the hardware configuration of each management server for use in the exemplary embodiment.

FIG. 3 illustrates an example of the hardware configuration of each management server for use in the exemplary embodiment. The management servers of this exemplary embodiment are the matchmaking management server 5 (see FIG. 1) and the space management server 6 (see FIG. 1).

The management server includes a control unit 101 that controls an overall operation of the apparatus, a hard disk drive 102 that stores management data and the like, and a network interface 103 that achieves communication via a local area network (LAN) cable or the like.

The control unit 101 includes a central processing unit (CPU) 111, a read only memory (ROM) 112 that stores basic software, a basic input/output system (BIOS), and the like, and a random access memory (RAM) 113 to be used as a working area. The CPU 111 may be a multi-core CPU. The ROM 112 may be a rewritable non-volatile semiconductor memory. The control unit 101 is a so-called computer.

The hard disk drive 102 is an apparatus that reads and writes data on a non-volatile storage medium obtained by applying a magnetic substance to the surface of a disc-shaped substrate. The non-volatile storage medium may be a semiconductor memory or a magnetic tape.

As necessary, the management server includes an input device such as a keyboard and a mouse, and a display device such as a liquid crystal display.

The control unit 101, the hard disk drive 102, and the network interface 103 are connected through a bus 104 and signal lines (not illustrated).

Figure 4:
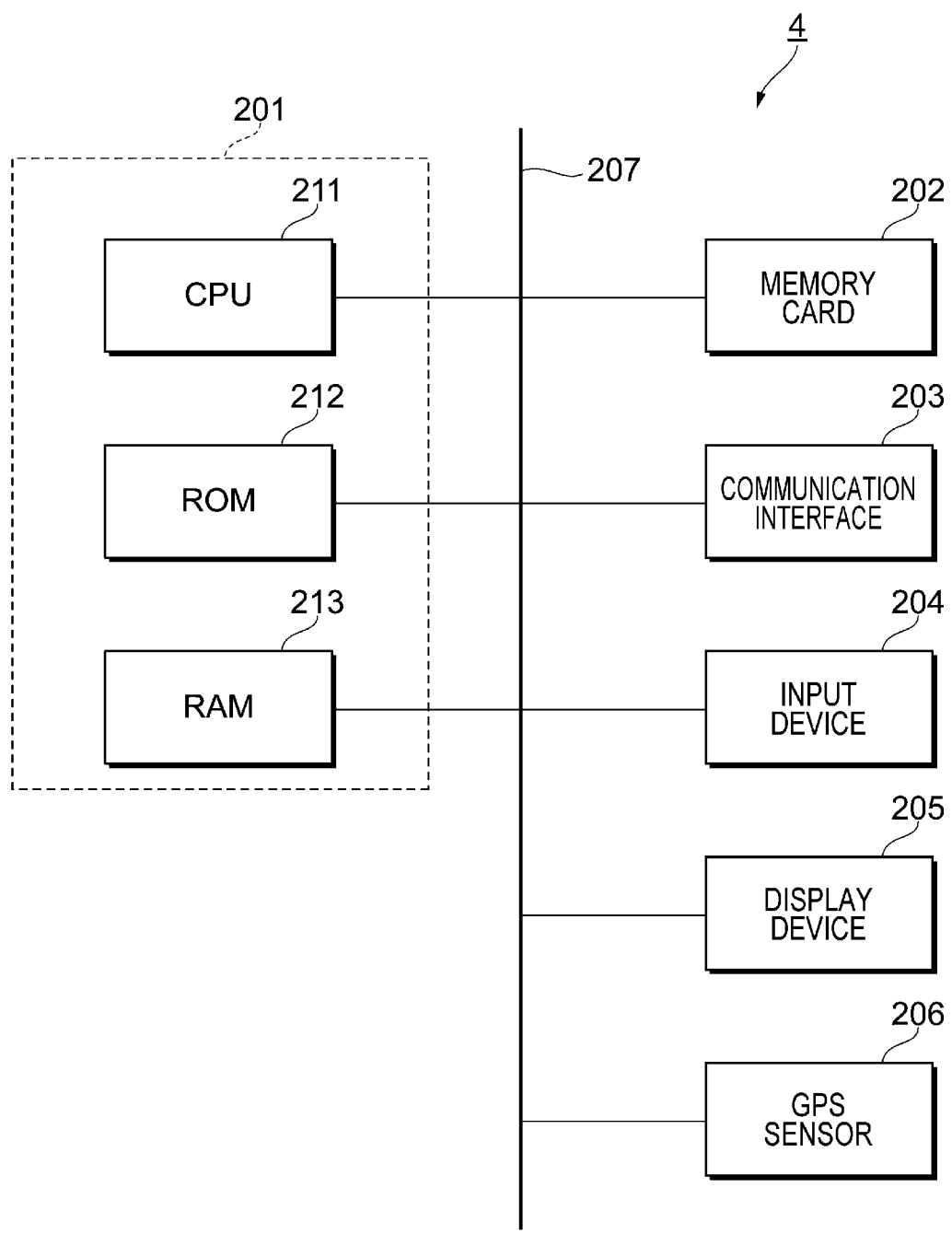
FIG. 4 illustrates an example of the hardware configuration of a user terminal according to the exemplary embodiment.

FIG. 4 illustrates an example of the hardware configuration of the user terminal 4 according to this exemplary embodiment. In FIG. 4, the user terminal 4 is assumed to be a smartphone.

The user terminal 4 includes a control unit 201 that controls an overall operation of the apparatus, a memory card 202 that stores various types of data, various types of communication interface 203 conforming to wireless communication standards, an input device 204 such as a touch sensor, a display device 205 such as a liquid crystal display or an organic electroluminescence (EL) display, a Global Positioning System (GPS) sensor 206, and a bus 207 that connects the respective parts.

The control unit 201 includes a CPU 211, a ROM 212 that stores firmware, a BIOS, and the like, and a RAM 213 to be used as a working area. The CPU 211 may be a multi-core CPU. The ROM 212 may be a rewritable non-volatile semiconductor memory.

Examples of the communication interface 203 include interfaces for connection to the matchmaking management server 5 and the space management server 6, and an interface for connection to a wireless LAN.

The GPS sensor 206 measures the position of the user terminal 4 by receiving an electric wave from a GPS satellite. Information on a latitude, a longitude, and an altitude output from the GPS sensor 206 indicates a current position of the user terminal 4. The GPS sensor 206 may be compatible with an indoor positioning system.

<Functional Configuration of Matchmaking Management Server>

Figure 5:
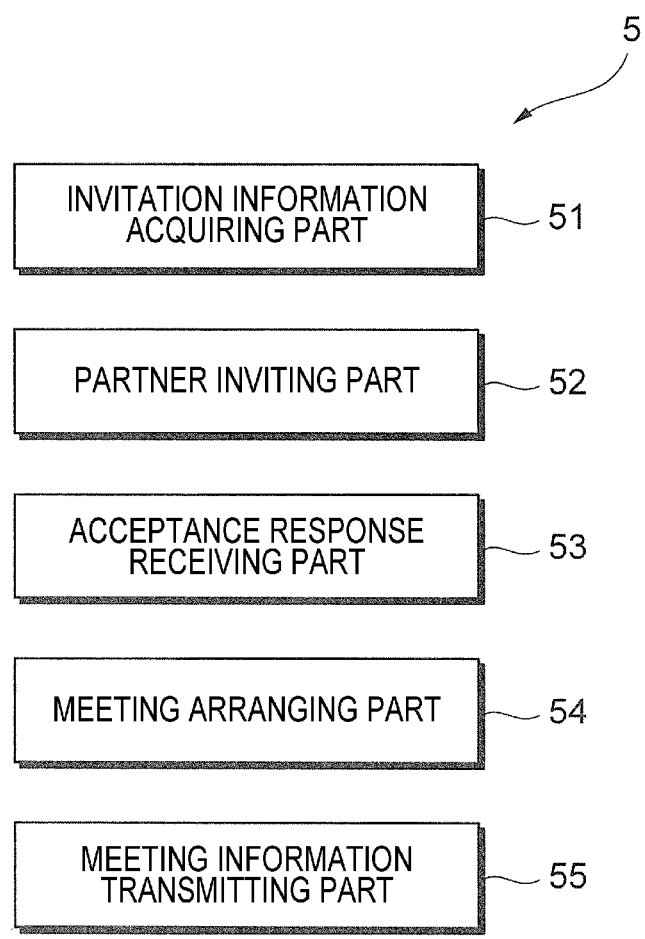
FIG. 5 illustrates an example of the functional configuration of a matchmaking management server.

FIG. 5 illustrates an example of the functional configuration of the matchmaking management server 5. The matchmaking management server 5 includes an invitation information acquiring part 51, a partner inviting part 52, an acceptance response receiving part 53, a meeting arranging part 54, and a meeting information transmitting part 55.

The invitation information acquiring part 51, which is an example of an acquirer, acquires information related to invitations from an inviter who invites persons sharing a specific purpose. More specifically, if the inviter accesses the matchmaking management server 5 on his/her user terminal 4, a website is displayed on the display device 205 of the user terminal 4. The inviter inputs information related to invitations on the website and the invitation information acquiring part 51 acquires the input information. The website is provided for matchmaking between users and may hereinafter be referred to as "matchmaking site".

The partner inviting part 52 invites persons based on the information related to invitations that is acquired from the inviter. For example, the partner inviting part 52 invites persons by posting information related to the inviter on the matchmaking site.

The acceptance response receiving part 53, which is an example of a receiver, receives a response for acceptance of an invitation. For example, the acceptance response receiving part 53 acquires, from a user terminal 4 of an accepter via the matchmaking site, information indicating that the accepter accepts the invitation from the inviter.

The meeting arranging part 54 arranges meeting of the inviter and the accepter. For example, the meeting arranging part 54 transmits and receives information between the inviter and the accepter via the matchmaking site. Specifically, the meeting arranging part 54 transmits information from the inviter to the user terminal 4 of the accepter and from the accepter to the user terminal 4 of the inviter. For example, the inviter and the accepter communicate with each other about a meeting place, a meeting date, and the type of information to be handled when the inviter and the accepter use a space 2.

Each space 2 is not determined as the meeting place but an area including the meeting place is determined as typified by "in New York" or "near Pennsylvania Station".

The meeting date includes a time to meet and a length of a meeting period. The meeting date may include a date and a time frame when persons are going to use a space 2, as typified by "Jun. 1, 2019 13:00-14:00". The meeting date may also include a date and a predetermined period, as typified by "Jun. 1, 2019 Morning".

For example, the type of information to be handled when the inviter and the accepter use a space 2 means whether the information is confidential information or whether the information is personal information.

The meeting information transmitting part 55 transmits, to the space management server 6, information on the meeting of the inviter and the accepter that is arranged by the meeting arranging part 54. The information on the meeting of the inviter and the accepter includes a history of the meeting of the inviter and the accepter in addition to the meeting place, the meeting date, the purpose of invitation, and the type of information to be handled when the inviter and the accepter use a space 2.

The functional parts of the matchmaking management server 5 are implemented in cooperation between a software resource and a hardware resource. Specifically, if the matchmaking management server 5 is implemented by the hardware configuration illustrated in FIG. 3, the functional parts such as the invitation information acquiring part 51, the partner inviting part 52, the acceptance response receiving part 53, the meeting arranging part 54, and the meeting information transmitting part 55 are implemented such that a program stored in the hard disk drive 102 is read on the RAM 113 and executed by the CPU 111.

<Functional Configuration of Space Management Server>

Figure 6:
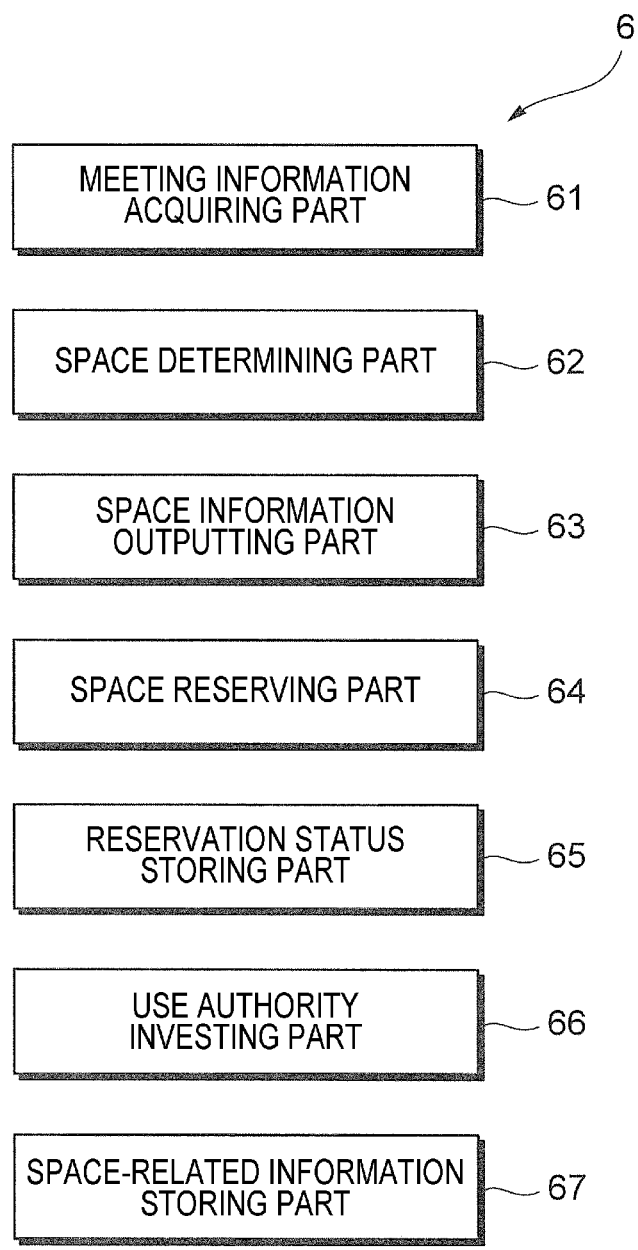
FIG. 6 illustrates an example of the functional configuration of a space management server.

FIG. 6 illustrates an example of the functional configuration of the space management server 6. The space management server 6 includes a meeting information acquiring part 61, a space determining part 62, a space information outputting part 63, a space reserving part 64, a reservation status storing part 65, a use authority investing part 66, and a space-related information storing part 67.

The meeting information acquiring part 61 acquires information on meeting of an inviter and an accepter from the matchmaking management server 5.

The space determining part 62 determines a candidate space 2 to be used by the inviter and the accepter among the plurality of spaces 2 based on the information on meeting of the inviter and the accepter. Details of a process of determining the space 2 are described later.

The space information outputting part 63, which is an example of an outputter, outputs information on the space 2 determined by the space determining part 62. For example, the space information outputting part 63 outputs the information on the space 2 determined by the space determining part 62 to the user terminal 4 of the inviter and the user terminal 4 of the accepter.

The space reserving part 64, which is an example of a reserver, makes a reservation for the space 2 determined by the space determining part 62. The space reserving part 64 may make a reservation for the space 2 if the inviter and the accepter agree to use the space 2 after the space information outputting part 63 has output the information on the space 2.

The space reserving part 64 stores various types of information related to the reservation in the reservation status storing part 65. Examples of various types of information related to the reservation include the information on the space 2 secured by the reservation, a start point and an end point of a time frame secured by the reservation, information on the inviter, and information on the accepter. Examples of the information on the space 2 secured by the reservation include information on an address, a location, a management name, and a management number of the space 2.

The reservation status storing part 65 stores various types of information related to the reservation made by the space reserving part 64. The reservation status storing part 65 stores various types of information related to reservations for each space 2.

When the reservation for the space 2 is made by the space reserving part 64, the use authority investing part 66, which is an example of the reserver, vests authority to enter the space 2 in the inviter and the accepter who are going to use the space 2. More specifically, the use authority investing part 66 transmits information on the authority to enter the space 2 to the user terminal 4 of the inviter and the user terminal 4 of the accepter. Examples of the authority information include an electronic key to be used for unlocking the electronic lock 22C.

The space-related information storing part 67 stores various types of information related to the function and performance of the space 2. Examples of various types of information related to the function and performance of the space 2 include information on equipment available in the space 2, the size of the space 2, materials for walls, the presence or absence of windows, and the number of windows. In addition to information on one space 2, information on a plurality of spaces 2 may be included as typified by the density of the plurality of spaces 2 or distances from other surrounding spaces 2. For example, those pieces of information are stored by settings made by an administrator of the information processing system 1 or a manager of the space 2.

The functional parts of the space management server 6 are implemented in cooperation between a software resource and a hardware resource. Specifically, if the space management server 6 is implemented by the hardware configuration illustrated in FIG. 3, the functional parts such as the meeting information acquiring part 61, the space determining part 62, the space information outputting part 63, the space reserving part 64, and the use authority investing part 66 are implemented such that a program stored in the hard disk drive 102 is read on the RAM 113 and executed by the CPU 111. For example, the reservation status storing part 65 and the space-related information storing part 67 are implemented by the ROM 112, the RAM 113, or the hard disk drive 102.

<Process to be Executed by Matchmaking Management Server>

Figure 7:
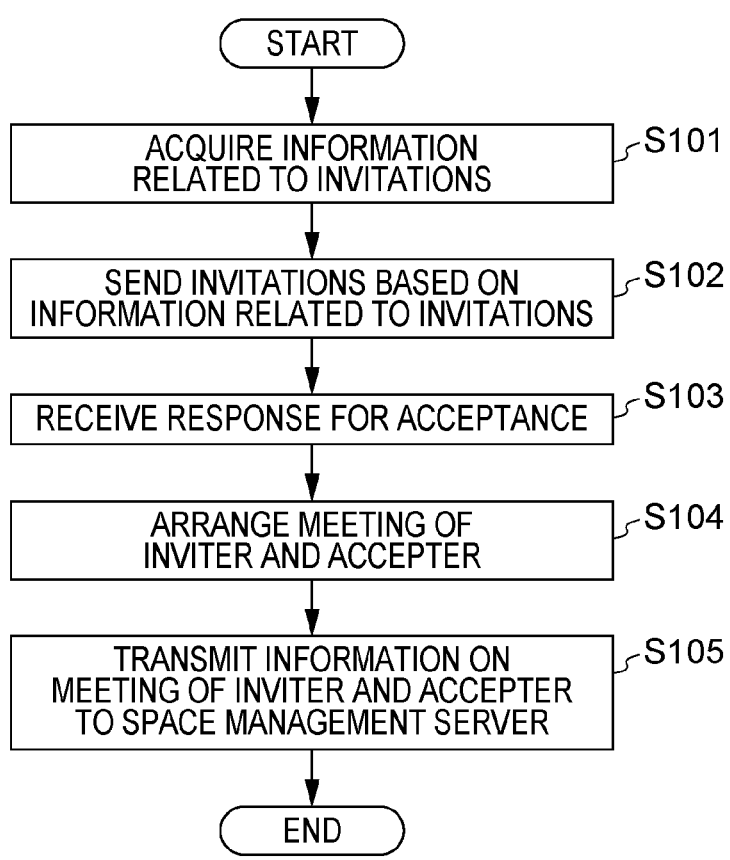
FIG. 7 is a flowchart illustrating an example of a procedure of a process to be executed by the matchmaking management server.

FIG. 7 is a flowchart illustrating an example of a procedure of a process to be executed by the matchmaking management server 5.

Each processing step is hereinafter represented by a symbol "S".

First, an inviter accesses the matchmaking management server 5 on his/her user terminal 4 and inputs information related to invitations on the matchmaking site. The invitation information acquiring part 51 acquires the information related to invitations (S101). Next, the partner inviting part 52 invites persons based on the information related to invitations (S102). If an accepter accepts the invitation, the acceptance response receiving part 53 receives a response for acceptance (S103).

Next, the meeting arranging part 54 arranges meeting of the inviter and the accepter (S104). For example, the inviter and the accepter communicate with each other to determine a meeting date, a meeting place, and the like. Next, the meeting information transmitting part 55 transmits, to the space management server 6, information on the meeting of the inviter and the accepter that is arranged by the meeting arranging part 54 (S105). Then, the process flow is terminated.

If the number of accepters exceeds an upper limit, accepters are determined through a predetermined procedure so that the number of accepters becomes equal to or smaller than the upper limit. Examples of the predetermined procedure include a procedure of sequentially determining accepters who accept invitations earlier, and a procedure of manually selecting accepters by the inviter. Examples of the upper limit include a value set by the inviter, and a value determined in advance on the matchmaking site. In this exemplary embodiment, the upper limit is an example of a predetermined number.

A period or a time limit to receive responses for acceptance may be provided. For example, the partner inviting part 52 terminates invitation and rejects responses for acceptance after a period set by the inviter has elapsed.

<Process to be Executed by Space Management Server>

Figure 8:
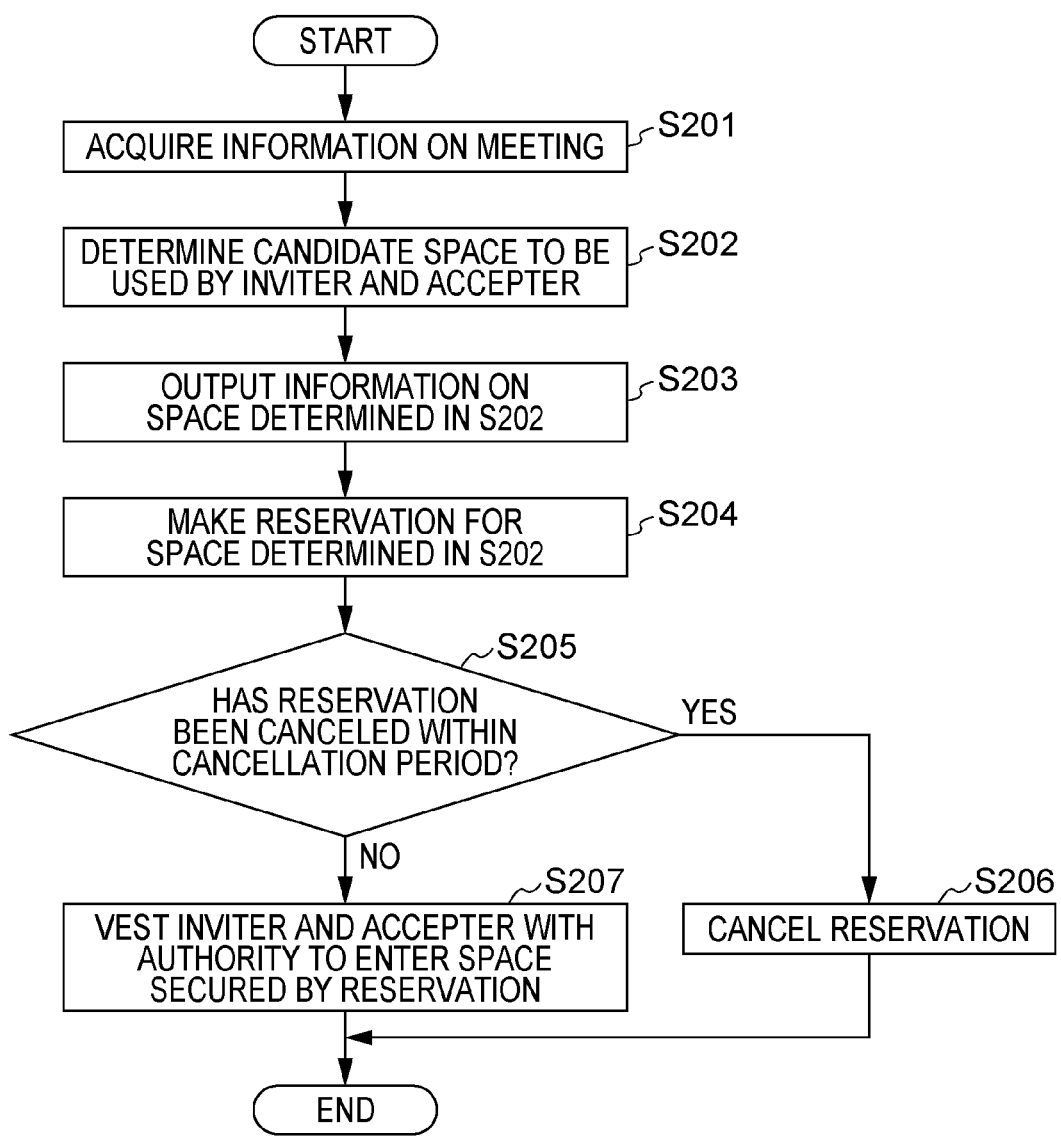
FIG. 8 is a flowchart illustrating an example of a procedure of a process to be executed by the space management server.

FIG. 8 is a flowchart illustrating an example of a procedure of a process to be executed by the space management server 6.

If the meeting information transmitting part 55 of the matchmaking management server 5 transmits the information on the meeting in S105 of FIG. 7, the meeting information acquiring part 61 acquires the information on the meeting (S201). Next, the space determining part 62 determines a candidate space 2 to be used by the inviter and the accepter based on the information acquired by the meeting information acquiring part 61 (S202). The process of S202 is described later in detail with reference to FIG. 9.

Next, the space information outputting part 63 outputs information on the space 2 determined in S202 (S203). For example, the information on the space 2 determined in S202 is output to the user terminal 4 of the inviter and the user terminal 4 of the accepter.

Next, the space reserving part 64 makes a reservation for the space 2 determined in S202 (S204). For example, the space reserving part 64 makes a reservation for the space 2 if the inviter and the accepter agree to use the space 2 after the space information outputting part 63 has output the information on the space 2. The space reserving part 64 stores various types of information related to the reservation in the reservation status storing part 65.

Next, the space reserving part 64 determines whether the reservation has been canceled within a cancellation period (S205). For example, if the inviter or the accepter has canceled the reservation on the matchmaking site, the matchmaking management server 5 gives a notification of the cancellation. The space reserving part 64 that receives the notification within the cancellation period outputs a positive determination result (YES) in S205. The cancellation period is set in the system for the matchmaking site. Specifically, the cancellation period is a period up to a day before a scheduled meeting date.

If the result of determination in S205 is positive (YES), the space reserving part 64 cancels the reservation (S206). Then, the process flow is terminated.

If the result of determination in S205 is negative (NO), the use authority investing part 66 vests the inviter and the accepter with authority to enter the space 2 secured by the reservation (S207). Then, the process flow is terminated.

The order of vesting of use authority and cancellation or change of a reservation is not limited. In the example illustrated in FIG. 8, the authority to use the space 2 is vested if the reservation is not canceled within the cancellation period. For example, use authority may be vested when the space reserving part 64 makes a reservation for a space 2 and, if the reservation is canceled, the vested use authority may be invalidated.

<Process of Determining Space>

Figure 9:
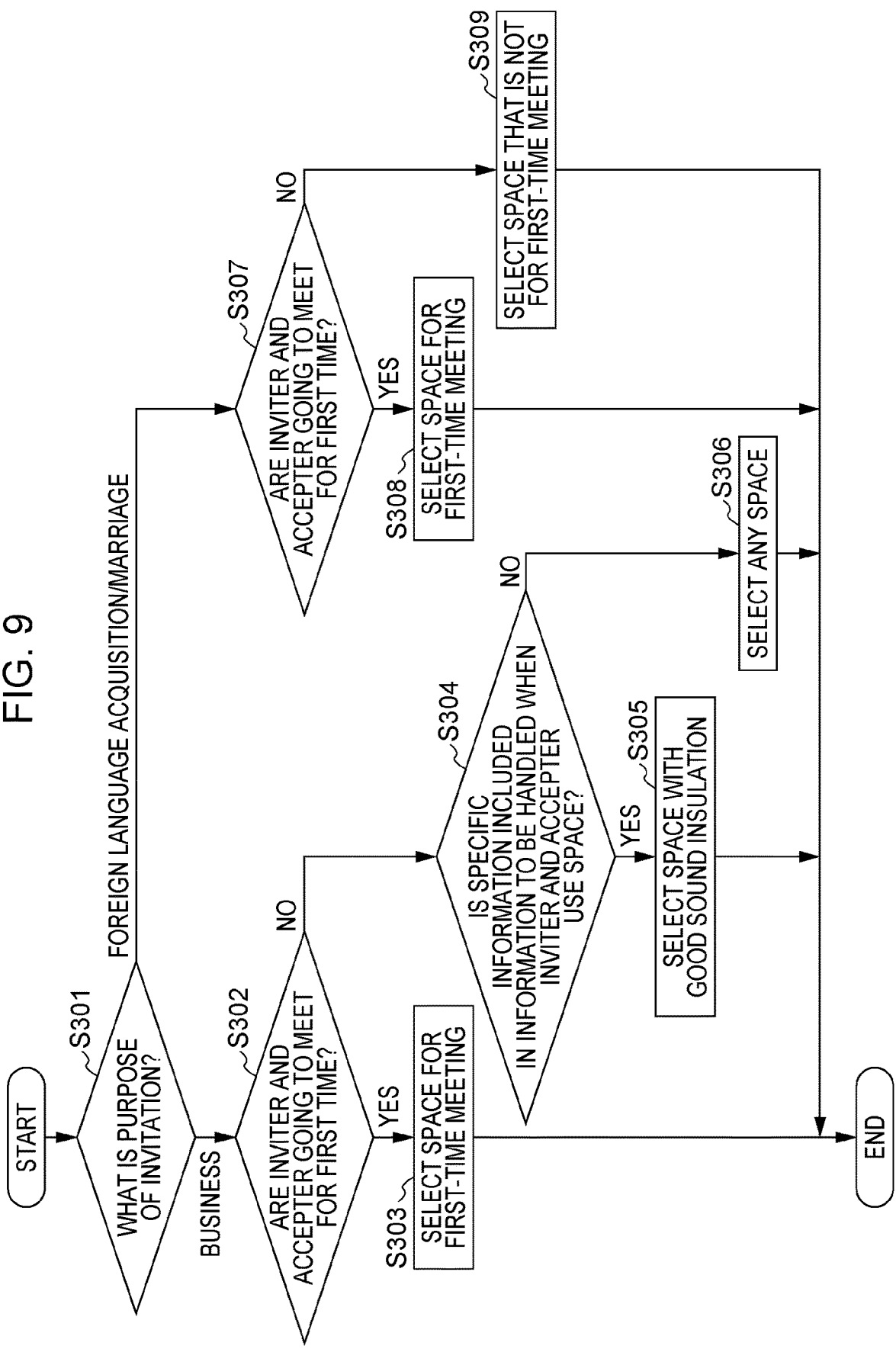
FIG. 9 is a flowchart illustrating an example of a procedure of a process of determining a candidate space to be used by an inviter and an accepter.

Next, detailed description is made of a procedure of the process of S202 of FIG. 8, that is, the process of determining a candidate space 2 to be used by the inviter and the accepter. FIG. 9 is a flowchart illustrating an example of the procedure of the process of determining a candidate space 2 to be used by the inviter and the accepter.

The space determining part 62 determines whether the purpose of invitation is business, foreign language acquisition, or marriage based on the information on meeting of the inviter and the accepter (S301).

If it is determined that the purpose of invitation is business in Step 301, the space determining part 62 determines whether the inviter and the accepter are going to meet for the first time (S302).

If the result of determination in S302 is positive (YES), the space determining part 62 selects a space 2 for first-time meeting as a candidate space 2 to be used by the inviter and the accepter (S303). The selected space 2 for first-time meeting is located at the meeting place and no reservation is made for the meeting date. Then, the process flow is terminated.

If the result of determination in S302 is negative (NO), the space determining part 62 determines whether specific information is included in information to be handled when the inviter and the accepter use a space 2 (S304). Examples of the specific information include confidential information and personal information.

If the result of determination in S304 is positive (YES), the space determining part 62 selects a space 2 with good sound insulation as a candidate space 2 to be used by the inviter and the accepter (S305). The selected space 2 with good sound insulation is located at the meeting place and no reservation is made for the meeting date. Then, the process flow is terminated. For example, the space 2 with good sound insulation has sound insulation equipment. The space 2 with good sound insulation is registered in advance. In this exemplary embodiment, the space 2 with good sound insulation is an example of a place closed to the outside.

If the result of determination in S304 is negative (NO), the space determining part 62 selects any space 2 as a candidate space 2 to be used by the inviter and the accepter (S306). The selected space 2 is located at the meeting place and no reservation is made for the meeting date. Then, the process flow is terminated.

If it is determined that the purpose of invitation is foreign language acquisition or marriage in S301, the space determining part 62 determines whether the inviter and the accepter are going to meet for the first time (S307).

If the result of determination in S307 is positive (YES), the space determining part 62 selects a space 2 for first-time meeting as a candidate space 2 to be used by the inviter and the accepter (S308). The selected space 2 for first-time meeting is located at the meeting place and no reservation is made for the meeting date. Then, the process flow is terminated.

If the result of determination in S307 is negative (NO), the space determining part 62 selects a space 2 that is not for first-time meeting as a candidate space 2 to be used by the inviter and the accepter (S309). The selected space 2 that is not for first-time meeting is located at the meeting place and no reservation is made for the meeting date. Then, the process flow is terminated.

For example, the space 2 for first-time meeting that is selected in S303 or S308 satisfies conditions that the space 2 is an open space, the inside is visible from the outside if the space 2 is a closed space, seats are arranged face to face across a desk (i.e., seats are not arranged side by side), and the inviter and the accepter are seated at a predetermined distance or more (e.g., 2 mm or more). The space 2 for first-time meeting may satisfy a plurality of the conditions or only one condition.

If a plurality of candidate spaces 2 are given in the process of S303, S305, S306, S308, or S309, any space 2 is selected in accordance with a predetermined rule. Examples of the predetermined rule include a rule that a space 2 nearest to a station is selected preferentially, and a rule that a space 2 nearest to the inviter's residence is selected preferentially.

If no candidate space 2 is given, for example, the inviter and the accepter are notified to change the meeting date. For example, the inviter and the accepter may be put on a waiting list and, if any reservation for a space 2 is canceled, the space 2 may automatically be selected as a candidate space 2 to be used by the inviter and the accepter.

In the example described above, the same process is executed irrespective of whether the purpose of invitation is foreign language acquisition or marriage. Different processes may be executed depending on whether the purpose of invitation is foreign language acquisition or marriage. For example, if the purpose of invitation is marriage, a cafe or a restaurant may preferentially be selected as a candidate space 2 to be used by the inviter and the accepter.

Thus, the space determining part 62 determines a candidate space 2 to be used by the inviter and the accepter depending on the purpose of invitation.

In the case of business, the inviter and the accepter have a business relationship. In the case of foreign language acquisition, the inviter and the accepter have a relationship of a teacher and a student in a foreign language lesson. In the case of marriage, the inviter and the accepter have a relationship of candidates of marriage partners. Thus, the process of determining a space 2 depending on the purpose of invitation may be regarded as a process of determining a space 2 depending on a relationship between the inviter and the accepter. The number of times the inviter and the accepter met previously in the determination of whether they are going to meet for the first time is an example of information indicating the relationship between the inviter and the accepter.

<Specific Examples of Processes to be Executed by Matchmaking Management Server and Space Management Server>

Next, description is made of specific examples of the processes to be executed by the matchmaking management server 5 and the space management server 6. FIGS. 10A to 11B illustrate the specific examples of the processes to be executed by the matchmaking management server 5 and the space management server 6. In the example illustrated in FIGS. 10A and 10B, the purpose of invitation is business. In the example illustrated in FIGS. 11A and 11B, the purpose of invitation is foreign language acquisition.

The following steps (i.e., symbols "S") correspond to the steps in FIG. 7 to FIG. 9.

(Example of Business Purpose)

For example, a company A, which is a business entity, seeks a company as a business partner. A user of the company A accesses the matchmaking management server 5 on his/her user terminal 4 and inputs information related to invitations on the matchmaking site. The information related to invitations includes requirements for a company that the company A seeks. Specifically, the requirements are a category of business, a size of business, abilities of personnel, and products on sale. The invitation information acquiring part 51 acquires the information related to invitations (S101). Next, the partner inviting part 52 invites persons based on the information related to invitations (S102).

Figure 10A:
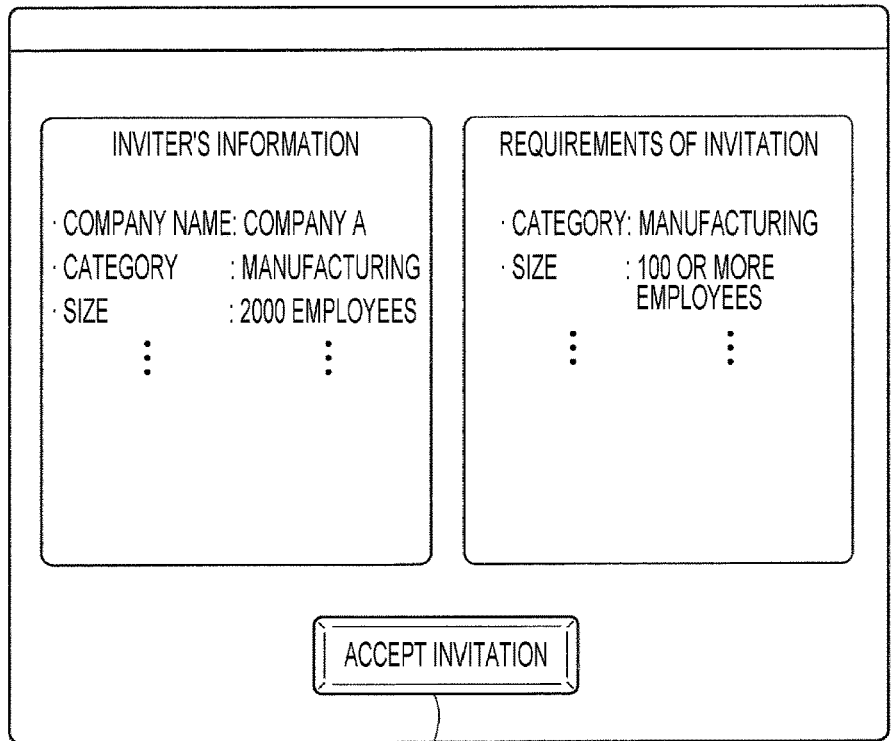
FIGS. 10A and 10B illustrate a specific example of the processes to be executed by the matchmaking management server and the space management server.

Through the invitation by the partner inviting part 52, the information related to invitations becomes viewable on the matchmaking site. FIG. 10A illustrates an example of information to be viewed when the purpose of invitation is business. "Inviter's Information" and "Requirements of Invitation" are input by the user of the company A. If an accepter views the matchmaking site on his/her user terminal 4 and selects an "Accept Invitation" button 11, the acceptance response receiving part 53 receives a response for acceptance (S103). In this example, a company B accepts the invitation. The company B has arranged meeting with the company A once.

Next, the meeting arranging part 54 arranges meeting of the company A and the company B (S104). For example, the company A and the company B communicate with each other to determine a meeting date and a meeting place. If the company A or the company B requests that a plurality of persons participate in the meeting, the number of participants is determined as well. In this example, the meeting date is "Jun. 1, 2019 13:00-14:00" and the meeting place is "New York". Information to be handled when the company A and the company B use a space 2 includes confidential information indicating business prospects for the future. Information on the arranged meeting is transmitted to the space management server 6 (S105).

Next, the meeting information acquiring part 61 acquires the information on the meeting from the matchmaking management server 5 (S201). The space determining part 62 determines a candidate space 2 to be used by the company A and the company B (S202).

In S202, the space determining part 62 determines that the purpose of invitation is business (S301). For example, the user of the company A may input, on the matchmaking site, information indicating that the purpose of invitation is business. If the matchmaking site is provided for business purposes, the use of the matchmaking site may trigger determination that the purpose of invitation is business.

Next, the space determining part 62 determines that the company A and the company B are going to meet for the second time ("NO" in S302). Next, the space determining part 62 determines that confidential information is included in the information to be handled when the company A and the company B use a space 2 ("YES" in S304). The space determining part 62 selects a space 2 with good sound insulation as a candidate space 2 to be used by the company A and the company B (S305). The selected space 2 with good sound insulation is located at the meeting place "New York" and no reservation is made for the meeting date "Jun. 1, 2019 13:00-14:00". In this example, a space 2A is selected.

Figure 10B:
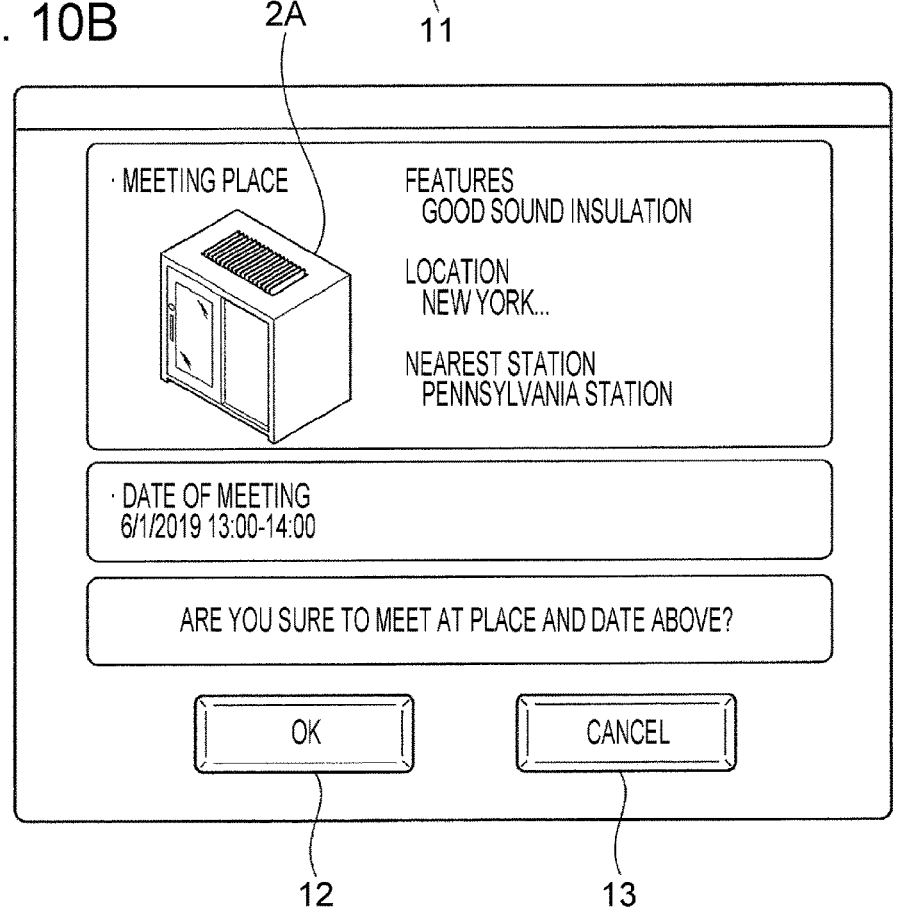

Next, the space information outputting part 63 outputs information on the space 2A to the user terminal 4 of the user of the company A and the user terminal 4 of the user of the company B (S203). FIG. 10B illustrates an example of the output information on the space 2A. For example, the information indicates that the meeting place is "space 2A" and the meeting date is "Jun. 1, 2019 13:00-14:00". If the company A and the company B agree to the meeting place and the meeting date, they may select "OK" buttons 12 on their user terminals 4. If the company A or the company B wants to change the meeting place or the meeting date, the company may select a "Cancel" button 13.

Next, the space reserving part 64 makes a reservation for the space 2A to be used on "Jun. 1, 2019 13:00-14:00" (S204). If the reservation is not canceled within a cancellation period ("NO" in S205), the use authority investing part 66 vests the company A and the company B with authority to enter the space 2A (S207). Specifically, the use authority investing part 66 provides electronic keys to the user terminal 4 of the user of the company A and the user terminal 4 of the user of the company B. The use authority investing part 66 may provide authentication codes or notify a manager of the space 2A that the company A and the company B are going to use the space 2A. The company A and the company B use the space 2A on "Jun. 1, 2019 13:00-14:00".

If the reservation has been canceled within the cancellation period ("YES" in S205), the meeting is rearranged. That is, the meeting date and the meeting place are changed or the meeting is canceled.

(Example of Foreign Language Acquisition Purpose)

For example, a student A seeks a foreign language teacher. The student A accesses the matchmaking management server 5 on his/her user terminal 4 and inputs information related to invitations on the matchmaking site. The information related to invitations includes requirements for a foreign language teacher whom the student A seeks. Specifically, the requirements are a nationality, a native language, and a sex of the teacher, the level of lessons, the fee for lessons, and inclusion of a free trial lesson. The level of lessons may be a business level, a daily conversation level, or the like. The invitation information acquiring part 51 acquires the information related to invitations (S101). Next, the partner inviting part 52 invites persons based on the information related to invitations (S102).

Through the invitation by the partner inviting part 52, the information related to invitations becomes viewable on the matchmaking site. FIG. 11A illustrates an example of information to be viewed when the purpose of invitation is foreign language acquisition. "Inviter's Information" and "Requirements of Invitation" are input by the student A. If an accepter views the matchmaking site on his/her user terminal 4 and selects an "Accept Invitation" button 11, the acceptance response receiving part 53 receives a response for acceptance (S103). In this example, a teacher B accepts the invitation. The teacher B has never met the student A.

Next, the meeting arranging part 54 arranges meeting of the student A and the teacher B (S104). For example, the student A and the teacher B communicate with each other to determine a meeting date and a meeting place. If the student A or the teacher B requests that a plurality of persons participate in the meeting, the number of participants is determined as well. In this example, the meeting date is "Jun. 2, 2019 15:00-16:00" and the meeting place is "New York". Information on the arranged meeting is transmitted to the space management server 6 (S105).

Next, the meeting information acquiring part 61 acquires the information on the meeting from the matchmaking management server 5 (S201). The space determining part 62 determines a candidate space 2 to be used by the student A and the teacher B (S202).

In S202, the space determining part 62 determines that the purpose of invitation is foreign language acquisition (S301). Similarly to the case of business, for example, the student A may input, on the matchmaking site, information indicating that the purpose of invitation is foreign language acquisition, or the use of the matchmaking site provided for the purpose of foreign language acquisition may trigger determination that the purpose of invitation is foreign language acquisition.

Next, the space determining part 62 determines that the student A and the teacher B are going to meet for the first time ("YES" in S307). Next, the space determining part 62 selects a space 2 for first-time meeting as a candidate space 2 to be used by the student A and the teacher B (S308). The selected space 2 for first-time meeting is located at the meeting place "New York" and no reservation is made for the meeting date "Jun. 2, 2019 15:00-16:00". In this example, a space 2B is selected.

Next, the space information outputting part 63 outputs information on the space 2B to the user terminal 4 of the student A and the user terminal 4 of the teacher B (S203). FIG. 11B illustrates an example of the output information on the space 2B. For example, the information indicates that the meeting place is "space 2B" and the meeting date is "Jun. 2, 2019 15:00-16:00". If the student A and the teacher B agree to the meeting place and the meeting date, they may select "OK" buttons 12 on their user terminals 4.

Next, the space reserving part 64 makes a reservation for the space 2B to be used on "Jun. 2, 2019 15:00-16:00" (S204). If the reservation is not canceled within a cancellation period ("NO" in S205), the use authority investing part 66 vests the student A and the teacher B with authority to enter the space 2B secured by the reservation (S207). The student A and the teacher B use the space 2B on "Jun. 2, 2019 15:00-16:00".

In this example, the student A and the teacher B are going to meet for the first time. If the student A and the teacher B are going to meet for the second or subsequent time ("NO" in S307), the space determining part 62 selects a space 2 that is not for first-time meeting as a candidate space 2 to be used by the student A and the teacher B (S309).

Before matchmaking, the student A may input conditions for a space 2 to be used in meeting for the second or subsequent time. For example, the student A may input, before matchmaking, conditions that the space 2 for first-time meeting is used also for the second or subsequent time, or the space 2 is an open space.

If the teacher B belongs to a foreign language school, the space determining part 62 may preferentially select, as a candidate space 2 to be used by the student A and the teacher B, a space 2 in a building of the foreign language school where the teacher B belongs. For example, the space determining part 62 preferentially selects the space 2 in the building of the foreign language school rather than a space 2 outside the building of the foreign language school. For example, if the building of the foreign language school has a space 2 that is not for first-time meeting, the space 2 may preferentially be selected even though the student A and the teacher B are going to meet for the first time.

<Other Example of Process of Making Reservation for Space>

Figure 12:
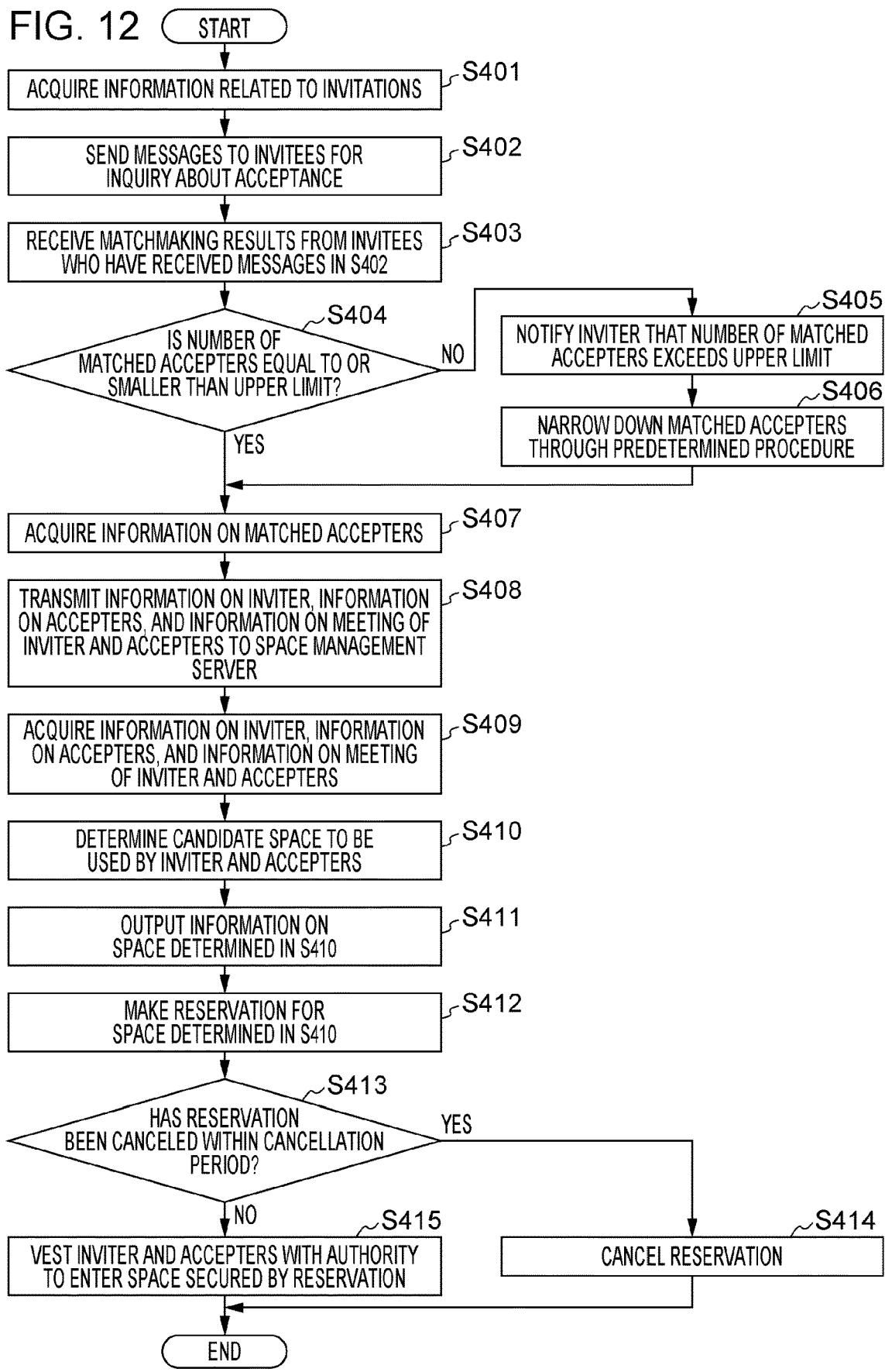
FIG. 12 is a flowchart illustrating another example of a process of making a reservation for a space.

Next, description is made of another example of the process of making a reservation for a space 2. FIG. 12 is a flowchart illustrating the other example of the process of making a reservation for a space 2. In the examples described above, the inviter and the accepter arrange the meeting after matchmaking. In the example illustrated in FIG. 12, an inviter invites persons while showing requirements of a meeting date and a meeting place.

First, the inviter accesses the matchmaking management server 5 on his/her user terminal 4 and inputs information related to invitations on the matchmaking site. The invitation information acquiring part 51 acquires the information related to invitations (S401). The inviter sets requirements for meeting as well as requirements for an accepter. The requirements for meeting include a meeting place and a meeting date. The meeting place is not a specific space 2 but an area including the meeting place is specified as typified by "in New York" or "near Pennsylvania Station". The meeting date may include a date and a time frame when persons are going to use a space 2, or a date and a predetermined period.

Next, the partner inviting part 52 sends messages to invitees for inquiry about acceptance (S402). The invitees are notified of the requirements for an accepter and the requirements for meeting, which are input in S401. Examples of the invitees include users randomly extracted from users registered in a contact list acquired from the user terminal 4 of the inviter, or users randomly extracted from users having their accounts on the matchmaking site.

Next, the acceptance response receiving part 53 receives matchmaking results from the invitees who have received the messages in S402 (S403). Matchmaking is successful if the invitee who has received the message in S402 decides to accept the invitation. Matchmaking is unsuccessful if the invitee decides to decline the invitation.

Next, the meeting arranging part 54 determines whether the number of matched accepters is equal to or smaller than an upper limit (S404). If the result of determination in S404 is negative (NO), the meeting arranging part 54 notifies the inviter that the number of matched accepters exceeds the upper limit (S405). In this case, the matched accepters are narrowed down through a predetermined procedure (S406). Examples of the predetermined procedure include a procedure of sequentially determining accepters who accept invitations earlier, and a procedure of manually selecting accepters by the inviter.

After S406 is executed or if the result of determination in S404 is positive (YES), the meeting arranging part 54 acquires information on the matched accepters (S407). The inviter and the accepters may determine a specific meeting date and a specific meeting place based on the requirements for meeting that are shown by the inviter.

Next, the meeting information transmitting part 55 transmits information on the inviter, information on the accepters, and information on meeting of the inviter and the accepters to the space management server 6 (S408). Next, the meeting information acquiring part 61 of the space management server 6 acquires the information on the inviter, the information on the accepters, and the information on the meeting of the inviter and the accepters (S409).

Next, the space determining part 62 determines a candidate space 2 to be used by the inviter and the accepters based on the pieces of information acquired by the meeting information acquiring part 61 (S410).

Processes of S411 to S415 are similar to the processes of S203 to S207 illustrated in FIG. 8 and description thereof is therefore omitted herein.

In S402, the partner inviting part 52 may send messages in consideration of the position of the inviter. For example, the partner inviting part 52 acquires, from the user terminal 4 of the inviter, positional information measured by the GPS sensor 206 of the user terminal 4. The partner inviting part 52 may send messages to limited users within a predetermined range (e.g., within 1 km) from a position indicated by the acquired positional information.

Other Examples

Next, other examples of this exemplary embodiment are described.

(Example of Process of Determining Space Depending on Purpose of Invitation)

In the examples described above, the space determining part 62 determines a candidate space 2 to be used by the inviter and the accepter depending on the purpose of invitation. The space determining part 62 may further determine a location of a space 2 depending on the purpose of invitation.

For example, if the purpose of invitation is business, the space determining part 62 selects a space 2 near the location of an accepter rather than a middle point between the location of an inviter and the location of the accepter. For example, if the purpose of invitation is foreign language acquisition, the space determining part 62 selects a space 2 near the residence of an accepter rather than a middle point between the residence of an inviter and the residence of the accepter. For example, if the purpose of invitation is marriage, the space determining part 62 selects a space 2 near a middle point between the residence of an inviter and the residence of an accepter.

If the purpose of invitation is a predetermined purpose, the space determining part 62 may determine a space 2 depending on a reservation status after a time frame secured for meeting of a user and an accepter.

For example, if the purpose of invitation is marriage, the space 2 may be used over a scheduled time frame. In this purpose of invitation, the space determining part 62 preferentially selects, for example, a space 2 having no reservation immediately after a time frame of meeting of an inviter and an accepter, or a space 2 having a predetermined period or more (e.g., 30 minutes or more) between an end point of a time frame secured by a reservation made by an inviter and an accepter and a start point of a time frame secured by a next reservation. In this case, marriage is an example of the predetermined purpose.

(Example of Process of Determining Space Depending on Relationship Between Inviter and Accepter)

In the examples described above, a space 2 is determined depending on the number of times an inviter and an accepter met previously. The number of times is an example of a relationship between the inviter and the accepter. As other examples of the relationship between the inviter and the accepter, a space 2 may be determined depending on a difference in sex between the inviter and the accepter, or a difference in age between the inviter and the accepter.

For example, if the sex of an inviter and the sex of an accepter differ from each other in the case of foreign language acquisition or marriage, women may particularly feel themselves in danger but may feel safety if the inviter and the accepter meet in a public place. For example, if the purpose of invitation is foreign language acquisition or marriage, the space determining part 62 determines whether the sex of the inviter and the sex of the accepter are the same. If the sex of the inviter and the sex of the accepter differ from each other, the space determining part 62 preferentially selects an open space 2 as a candidate space 2 to be used by the inviter and the accepter.

Similarly, if a difference in age between an inviter and an accepter is equal to or larger than a predetermined value (e.g., 20 years), the inviter or the accepter may feel himself/herself in danger but may feel safety if the inviter and the accepter meet in a public place. For example, if the purpose of invitation is foreign language acquisition or marriage, the space determining part 62 determines whether the difference in age between the inviter and the accepter is equal to or larger than the predetermined value. If the difference in age between the inviter and the accepter is equal to or larger than the predetermined value, the space determining part 62 preferentially selects an open space 2 as a candidate space 2 to be used by the inviter and the accepter.

(Example of Process of Determining Space in Consideration of Traveling Expense or Moving Period)

The space determining part 62 may determine a candidate space 2 to be used by an inviter and an accepter depending on a traveling expense or a moving period required to reach the space 2.

For example, the space determining part 62 preferentially selects a space 2 that costs a smaller traveling expense from the residence of an accepter to the space 2. For example, the space determining part 62 preferentially selects a space 2 that is shorter in a moving period from the residence of an accepter to the space 2.

The fee for meeting may be set depending on a traveling expense or a moving period required to reach a space 2. For example, if the purpose of invitation is foreign language acquisition, the fee for a foreign language lesson may be set smaller as the traveling expense from the residence of a teacher to a space 2 is smaller. For example, the fee for a foreign language lesson may be set larger as the moving period from the residence of a teacher to a space 2 is longer.

(Example of Process of Determining Space Depending on Weather)

The space determining part 62 may determine a candidate space 2 to be used by an inviter and an accepter depending on weather.

The space determining part 62 acquires information on a weather forecast on a meeting date. For example, if the weather forecast on the meeting date is for rain, the space determining part 62 preferentially selects a space 2 near a station. If the weather forecast on the meeting date is for rain, a space 2 that is not for first-time meeting but is closer to a station than a space 2 for first-time meeting is may preferentially be selected even though an inviter and an accepter are going to meet for the first time.

(Example of Output of Candidate Time Frame for Use of Space)

In the examples described above, the space information outputting part 63 outputs information on a candidate space 2 to be used by an inviter and an accepter. The space information outputting part 63 may output information on a candidate time frame for use of a space 2 together with information on the space 2.

For example, the meeting date determined by an inviter and an accepter is "Jun. 1, 2019 Morning". The space determining part 62 selects a space 2A as a candidate space 2 to be used by the inviter and the accepter. If the reservation status of the space 2A on "Jun. 1, 2019 Morning" shows that no reservation is made for "09:00-10:00" and "11:00-12:00" and reservations are made for the other time frames, the candidate time frame for use of the space 2A is "09:00-10:00" or "11:00-12:00". For example, the space information outputting part 63 outputs information indicating "09:00-10:00" as information on the candidate time frame for use of the space 2A.

The space information outputting part 63 may output information on a candidate time frame for use of a space 2 depending on the purpose of invitation or a relationship between an inviter and an accepter.

For example, the space determining part 62 may determine a start time and an end time of meeting or a length of meeting time depending on the purpose of invitation.

More specifically, if the purpose of invitation is business, the space determining part 62 selects 30 minutes in the daytime as a candidate time frame for use of a space 2. For example, if the purpose of invitation is foreign language acquisition, the space determining part 62 selects 1 hour in the early morning or in a time range later than 19:00 as a candidate time frame for use of a space 2.

The space determining part 62 may determine a start time and an end time of meeting or a length of meeting time depending on a relationship between an inviter and an accepter.

More specifically, if an inviter and an accepter are going to meet for the first time, the space determining part 62 selects a time frame in the daytime as a candidate time frame for use of a space 2. For example, if an inviter and an accepter are going to meet for the second or subsequent time, the space determining part 62 selects a time frame not only in the daytime but also in the morning and the nighttime as a candidate time frame for use of a space 2. If an inviter and an accepter are going to meet for the first time, the meeting time is set shorter than in a case where they are going to meet for the second or subsequent time. For example, the meeting time is set to 30 minutes if an inviter and an accepter are going to meet for the first time. The meeting time is set to 1 hour if an inviter and an accepter are going to meet for the second or subsequent time.

In the examples described above, users are matched on the matchmaking site provided by the matchmaking management server 5 but the matchmaking method is not limited. For example, a plurality of users may be matched by communicating with each other on their user terminals 4 without intervention of the matchmaking management server 5. Specifically, the user terminal 4 identifies other user terminals 4 in its surroundings by using close-proximity wireless communication such as Bluetooth (registered trademark), wide-area wireless communication such as low power wide area (LPWA), or positional information measured by the GPS sensor 206. The user terminal 4 communicates with the other identified user terminals 4 to match users. If users are matched without intervention of the matchmaking management server 5, the user terminal 4 partially or entirely implements the functions of the space management server 6. In this exemplary embodiment, the user terminal 4 may partially or entirely implement the functions of the space management server 6.

The program that implements the exemplary embodiment of the present disclosure may be provided by a communication unit and may also be provided by being stored in a recording medium such as a CD-ROM.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system, comprising:
   a first server, comprising a first processor, being configured to:
   acquire, from a user, information related to invitation of persons who share a specific purpose; and
   receive a response for acceptance of the invitation; and
   a second server, comprising a second processor, being configured to:
   output information on a candidate place to be used by the user and an accepter who accepts the invitation,
   wherein the output information on the place depends on information to be handled when the user and the accepter use the place.

2. The information processing system according to claim 1, wherein the second processor is further configured to: make a reservation for the place based on the information on the place that is output.

3. The information processing system according to claim 2, wherein the second processor is further configured to vest the user and the accepter with authority to enter the place secured by the reservation.

4. The information processing system according to claim 3, wherein, if a number of accepters exceeds a predetermined number, the second processor is further configured to vest the authority in the predetermined number of accepters determined through a predetermined procedure.

5. The information processing system according to claim 1, wherein the second processor is further configured to output the information on the place depending on the specific purpose.

6. The information processing system according to claim 5, wherein, if the specific purpose is a predetermined purpose, the second processor is further configured to output the information on the place depending on a reservation status of a place to be used by making a reservation, the reservation status being a reservation status after a time frame during which the user and the accepter use the place.

7. The information processing system according to claim 1, wherein the second processor is further configured to output the information on the place depending on a relationship between the user and the accepter.

8. The information processing system according to claim 7, wherein the relationship between the user and the accepter is a number of times the user and the accepter met previously.

9. The information processing system according to claim 7, wherein the relationship between the user and the accepter is a difference in sex between the user and the accepter.

10. The information processing system according to claim 7, wherein the relationship between the user and the accepter is a difference in age between the user and the accepter.

11. The information processing system according to claim 1, wherein, if confidential information is included in the information to be handled when the user and the accepter use the place, the second processor is further configured to output information on a place closed to an outside.

12. The information processing system according to claim 1, wherein the second processor is further configured to output information on a candidate time frame for use of the place together with the information on the place.

13. The information processing system according to claim 12, wherein the second processor is further configured to output the information on the time frame depending on the specific purpose.

14. The information processing system according to claim 12, wherein the second processor is further configured to output the information on the time frame depending on a relationship between the user and the accepter.

15. A non-transitory computer readable medium storing a program causing a computer to execute a process comprising:
   acquiring, from a user, information related to invitation of persons who share a specific purpose;
   receiving a response for acceptance of the invitation; and
   outputting information on a candidate place to be used by the user and an accepter who accepts the invitation,
   wherein the output information on the place depends on information to be handled when the user and the accepter use the place.

16. An information processing system, comprising:
   acquisition means for acquiring, from a user, information related to invitation of persons who share a specific purpose;
   reception means for receiving a response for acceptance of the invitation; and
   output means for outputting information on a candidate place to be used by the user and an accepter who accepts the invitation,
   wherein the output information on the place depends on information to be handled when the user and the accepter use the place.

* * * * *